Oct. 12, 1965 E. A. DAMERAU ETAL 3,212,075

RIGID INFORMATION STORAGE DEVICE UPON WHICH A LAYER OF RESILIENT MATERIAL IS DISPOSED

Filed May 9, 1961

INVENTORS
EDWARD A. DAMERAU &
BY ROBERT H. JENKINS

Morris L. Rabkin
ATTORNEY

United States Patent Office
3,212,075
Patented Oct. 12, 1965

3,212,075

RIGID INFORMATION STORAGE DEVICE UPON WHICH A LAYER OF RESILIENT MATERIAL IS DISPOSED

Edward A. Damerau, Pine Hill, and Robert H. Jenkins, Audubon, N.J., assignors to Radio Corporation of America, a corporation of Delaware
Filed May 9, 1961, Ser. No. 108,810
9 Claims. (Cl. 340—174.1)

The present invention relates to an improved information storage device of the record type and to a method of making the same. More particularly, the invention relates to an improved magnetic record on which signals can be recorded for storage thereon and to a method of manufacture thereof.

An information storage device in accordance with this invention is especially suitable for use in electronic data processing equipment to provide storage for digital or discrete information. However, the features of the invention will be found generally useful in the recording and reproduction of information in any form whatsoever.

Reliability is of primary importance in the recording and reproduction of discrete signals such as those which represent digital data. Each unit of information or bit is recorded in its own discrete area or bit cell of the record. If, for any reason, the record is defective in the bit cell, the information may be lost or erroneously recorded on, or erroneously reproduced from, the record. Magnetic recording and reproduction is especially susceptible to imperfections in the surface of the record medium. Any irregularity in the recording surface, however minute, is undesirable. Such irregularities change the space relationship between the recording surface and a magnetic transducing head which cooperates with the record, for example, by preventing the head from remaining in intimate contact with the recording surface. When the head is not in intimate contact with the recording surface, signals may not be properly recorded on or reproduced from the record.

A relatively rigid magnetic record, such as a disc or rectangular card-like member, as distinguished from a film or tape, is needed at times. Such records are especially suitable for use in random access memory devices, since they must be handled and moved from place to place. Relatively rigid magnetic records which have been provided prior to the present invention have not been entirely satisfactory. The prior magnetic records have not had as smooth, flat, and uniform surface characteristics as desired to provide the best magnetic recording and reproducing properties. This was especially the case in digital or other discrete signal recording applications.

Some prior magnetic records have been made of relatively rigid tablets having a coating of magnetic material bonded directly thereto. Such tablets, however, are subject to warping. Moreover, surface irregularities such as bumps and other deviations either on the tablet surface or in coatings on the tablet have prevented the magnetic head from remaining in proper intimate contact with the record. Expensive and complex mechanisms, such as those employing air floatation of the magnetic heads, have been proposed to compensate for lack of uniformity in the recording surface of the record. In general, the relatively rigid records and mechanisms of the prior art have been found to be not as satisfactory in their recording properties, as conventional magnetic tape. The present invention affords the advantages of magnetic tape in a relatively rigid magnetic record.

It is an object of the present invention to provide an improved information storage device which has reliable information storage properties.

It is a further object of the present invention to provide an improved record of the relatively rigid type and yet has desirable recording properties making it especially suitable for storage of digital information thereon.

It is a still further object of the present invention to provide a magnetic record in which intimate contact between the recording surface of the record and a cooperating magnetic head is facilitated.

It is a still further object of the present invention to provide an improved magnetic record which is generally rigid, so that it can be handled with facility, and yet has the flexibility characteristic of magnetic tape records.

It is a still further object of the present invention to provide an improved magnetic record as aforesaid which may be manufactured at low cost.

It is a still further object of the invention to provide an improved rigid record on which information may be recorded by inexpensive techniques and which possesses many of the advantages of recording by more expensive techniques.

It is an other object of the present invention to provide a novel method of making a magnetic record which record has the aforesaid advantages and attains the aforesaid objects.

It is another object of the present invention to provide an improved, relatively rigid, magnetic record which has recording and reproducing properties similar to magnetic tape and to a method of making same.

An information storage device in accordance with the invention includes a relatively rigid member, such as a tablet, on the surface of which a body or layer of resilient material is disposed. A surface member, such as a piece of a flexible recording medium, is so secured to the tablet over the body of resilient material as to enclose a volume in which a fluid, such as air, may be confined. The recording medium may be a sheet, strip, or annulus of magnetic tape large enough to encompass the body of resilient material. When a transducing device, such as a magnetic head, passes over the superficial layer of the tape which is its recording surface, it is cushioned both by the body of resilient material and by the fluid confined under the tape. The fluid will also be caused to flow around the head as the head moves relative to the record, thereby urging the tape into very intimate contact with the head. When a magnetic tape segment is used as the recording medium, the information storage device will have the advantages of both magnetic tape and relatively rigid types of records. Strict dimensional tolerances for the tablets are not necessary, since the resilient body and the confined fluid allow the recording surface to conform to the shape of the transducer in spite of slight deviations from uniformity in the surface of the tablet.

The information storage device may be made in accordance with the improved method of the invention by first placing the resilient body on the surface of the tablet and then adhering and sealing the edges of the flexible recording medium to the tablet. There is thus enclosed between the recording medium and the resilient body a volume in which a fluid, such as air, is trapped.

The invention itself, both as to its organization and method of operation, as well as additional objects and advantages thereof, will become more readily apparent from a reading of the following description in connection with the accompanying drawing, in which.

Figure 1:
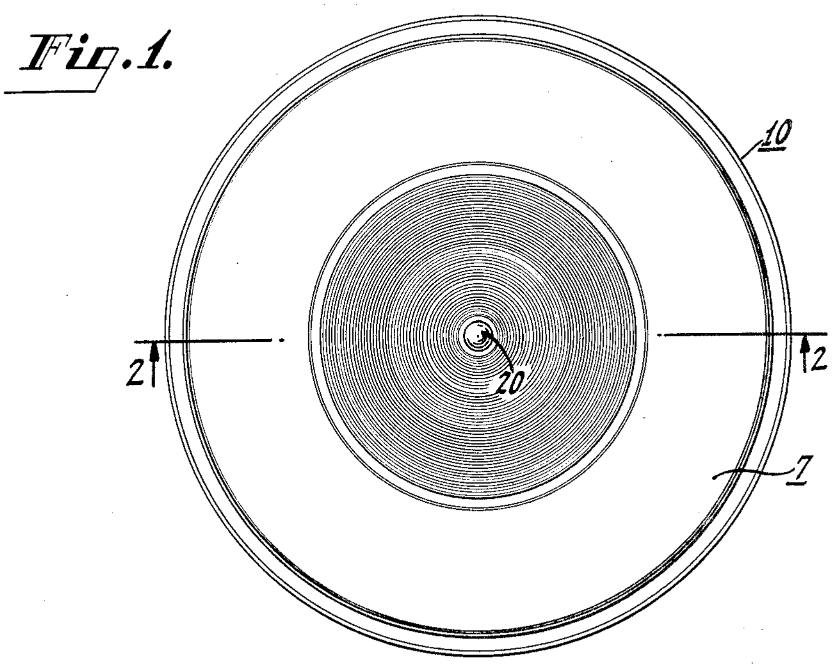
FIGURE 1 is a plan view of one form of a magnetic disc record in accordance with the present invention and suitable for use as an information storage device.
Figure 2:
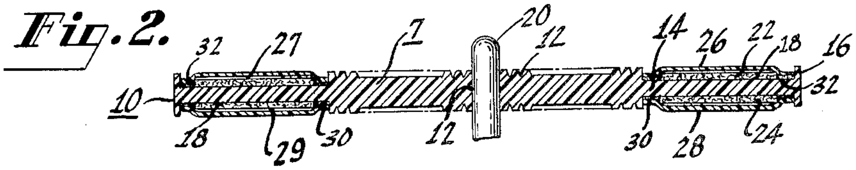
FIGURE 2 is a sectional view taken along the line 2—2 of FIGURE 1 and viewed in the direction of the appended arrows.
Figure 3:
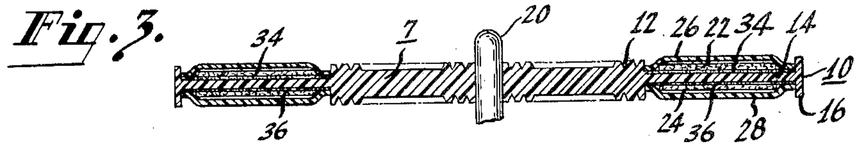
FIGURE 3 is a sectional view similar to FIGURE 2 of another form of magnetic disc record in accordance with the present invention.
Figures 4, 5, 6:
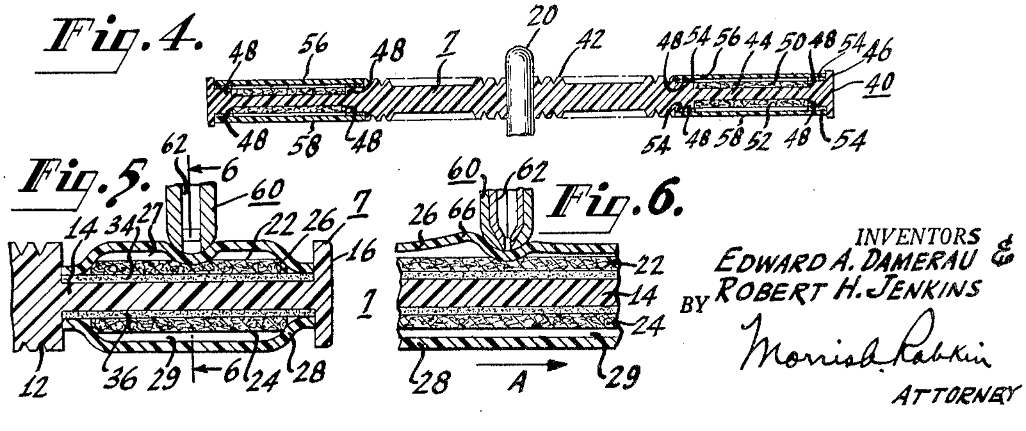
FIGURE 4 is a similar sectional view of still another form of magnetic disc record in accordance with the present invention.
FIGURE 5 is a fragmentary sectional view of a magnetic disc record in accordance with the invention shown in cooperating relationship with a magnetic head.
FIGURE 6 is a fragmentary sectional view of the disc record and head shown in FIGURE 5 taken along the line 6—6 of FIGURE 5 and viewed in the direction of the appended arrows.

Referring more particularly to FIGURE 1, there is shown a magnetic disc record 7 which is laminated from a plurality of layers and may have the internal construction exemplified in any of FIGURES 2, 3 or 4. The record 7 includes a relatively rigid tablet core 10. The tablet is a circular disc member having relatively thick hub 12, a somewhat thinner web 14 and a relatively thick rim 16. The web 14, hub 12 and rim 16 define annular channels 18 in the circular faces of the tablets. The hub 12 has a spiral tracking groove in each of the opposite surfaces thereof. The hub 12 also has an axial hole therethrough for receiving a spindle 20. The spindle is attached to a turntable (not shown) which serves to rotate the record. The tablet 10, itself, is a substantially rigid member desirably molded from a non-magnetic plastic material. A polycarbonate plastic, such as sold under the trade name "Lexan" by the General Electric Company, Schenectady, New York, is suitable.

The record also includes a pair of annular bodies or layers 22 and 24 of resilient cushing material. The material of the bodies 22, 24 may be porous paper, such as used in cleansing tissues, felt foam or the like. In a preferred form, the bodies 22 and 24 may be formed of fibrous flock. This flock may be constituted, for example, of either random or sorted lengths of fibrous material such as nylon, rayon, or polyester fibers. The fibers preferably have lengths of .015 inch to 0.21 inch.

The record 7 also includes a pair of annuluses 26 and 28 of magnetic recording tape. These annuluses 26 and 28 may be formed from sheets of magnetic tape material. Such magnetic tape material may be made of a sheet of polyester film, acetate film or other plastic film having a coating of retentive magnetic material. This coating provides the recording surface of the record. The magnetic material desirably has no preferred direction of magnetic orientation.

The magnetic tape annuluses 26 and 28 are so disposed over the bodies of resilient material 22 and 24 as to confine volumes of air 27 and 29 between the respective tape annuluses 26 and 28 and the bodies 22 and 24 of resilient material. This confined air serves as a cushion which permits the tape to conform to the surface of a cooperating magnetic head. The fibers constituting the flock in the bodies of resilient material act like a multitude of discrete springs which also permit the tape to conform to the head. The head and the tape will therefore be continuously in intimate contact with each other regardless of surface irregularity in the tablet 10.

The bodies of resilient material 22 and 24 and the tape annuluses 26 and 28 may be secured to the tablet and the record assembled in different ways, each in accordance with a separate embodiment of the invention. These embodiments will be described in connection with FIGURE 2, 3 and 4, and the mode of cooperation of the various forms of records with an associated magnetic head will be described in connection with FIGURES 5 and 6.

Referring, first, to FIGURE 2, the record may be assembled by first placing the body 22 of resilient material on the web 14 in the upper channel 18 of the tablet 10. It will be observed that the body 22 is narrower in a radial direction than the channel 18. The height of the body 22 is less than the depth of the channel 18 so that the rim 16 and hub 12 extend to a level above the body 22. A pair of annular grooves are thus defined between the edges of the body 22 and the walls of the hub 12 and the rim 16, respectively. Layers 30 and 32 of the adhesive material are disposed in these grooves. This adhesive material is desirably both pressure sensitive or tacky and heat sensitive. A polyester adhesive sold by the E. I. du Pont de Neumours Co. of Wilmington, Delaware. Dupont polyester adhesive No. 46,960 with a curing agent such as Dupont No. RC–805 may be suitable. The adhesive material may be applied with a hypodermic syringe device, a roller type applicator, or with a spray gun. Alternatively, strips of paper which are saturated with the adhesive material may be used. Since the adhesive material fills the grooves, it secures the body 22 of resilient material to the tablet. It will be noted that the edges of the body contact the adhesive.

The annulus 26 of magnetic tape is placed in the channel 18 loosely over web 14. It will be observed that the radial width of the tape annulus 26 is approximately equal to the radial width of the web 14 (i.e., approximately equal to the width of the channel 18). The coating of magnetizable material providing the recording surface of the tape annulus 26 faces outwardly from the tablet 10. The edges of the tape annulus 26 are placed into the groove 18 and pressed upon the adhesive layers 30 and 32. Since these layers are somewhat tacky, the edges of the tape annulus 26 will adhere thereto at spaced points on the annulus, particularly along the edges of the annulus. The adhesive layers 30 and 32 provide a fluid tight seal around the peripheral edges of the tape annulus 26. Since the tape annulus 26 is initially loosely disposed over the body 22 of resilient material, a film or volume of air will be confined between the tape and the body of resilient material. The overall height of the body 22 of resilient material, the tape annulus 26 and the confined air is approximately equal to the height of the hub and rim so that the edges of the tape annulus 26 are protected by the hub and the rim.

The other body of resilient material 24 and the other tape annulus 28 may be assembled in a similar manner as the first-mentioned body 22 of resilient material and the tape annulus 26. After the parts have been assembled by pressing the tape annuluses 26 and 28 against all the adhesive layers 30 and 32, the entire record may be heated so that the heat sensitive adhesive material may permanently set. This heating may be accomplished in a radio frequency oven or by a radio frequency coil in which the record is placed. Alternatively a heated tool may be used to press the edges of the tape annuluses into the grooves. Thus, the adhesive will set as the tape is pressed into place. The record may be assembled by automatic machines as well as by hand. For example, an automatic press may be used to press the edges of the tape annuluses 26 and 28 against the adhesive layers 30 and 32.

It may be desired to apply the flock directly onto the tablet to form layers of flock which provide the bodies 22 and 24 of resilient material. Alternatively, layers of flock may be applied to the base (uncoated) side of the annuluses 26 and 28. The flock may be applied by an electrostatic technique using the phenomenon that an insulating particle will be attracted to a charged surface. The flock thus may be deposited by electrostatically charging the tablet 10 or the tape annuluses in the desired region thereof on which the layers of flock are to be deposited. Adhesive material may be applied initially to the tablet or to the tape so that the applied flock adheres thereto. Flock may be deposited as described above to form the bodies of resilient material in each of the embodiments of the invention which are described herein.

Referring to FIGURE 3, layers of adhesive material 34 and 36 may be applied on both opposite sides of the web 14 of the tablet 10. These layers may be annular strips of paper which are saturated with the pressure and heat sensitive adhesive. The bodies of resilient material 22 and 24 are then placed upon the adhesive paper 34 and 36 in centered relation to the web 14. Grooves are thus formed between the bodies of resilient material 22 and 24, the hub 12, and rim 16 of the tablet 10. The adhesive layers 34 and 36 extend across the bottoms of their respective grooves. The bodies 22 and 24 will adhere to the paper. The tape annuluses 26 and 28 are then placed loosely over the bodies 22 and 24. The edges of the tape annuluses are pressed down into the grooves so that these edges are secured and sealed to the adhesive layers 34 and 36 which are on the groove bottoms. Volumes of air are thereby confined between the bodies 22 and 24 of resilient material and their associated tape annuluses 26 and 28, respectively. The record may then be heated, as by radio frequency energy, to permanently set the adhesive. The dimensional relationships among the rim, hub, tape annuluses, confined air, and resilient bodies are the same as is the case for the record of FIGURE 2.

Referring to FIGURE 4, the record includes a circular tablet 40 which is constructed somewhat differently from the tablet 10. This tablet has a relatively thick, grooved hub 42, a thin web 44, and a thick rim 46. The web 44 is formed with annular shoulders 48. In other words, the annular channels between the hub 42 and the rim 46 have inner and outer peripheral shoulders 48. Bodies 50 and 52 of resilient material are disposed on opposite sides of the web 44 between the shoulders 48. Layers of adhesive material 54 are disposed on each of the annular shoulders 48. These layers may be paper saturated with pressure and heating sensitive material of the type heretofore described. Some of the adhesive secures the resilient bodies to the vertical edges of the shoulders 48. Magnetic tape annuluses 56 and 58 are secured to the adhesive layers 54 at the shoulders 48 by pressing the edges of the tape against the shoulders 48. Accordingly, volumes of air are confined between the bodies 50 and 52 of resilient material and the tape annuluses 56 and 58. After the tape annuluses have been pressed in position on the shoulder, the record is heated to set the adhesive, as by radio frequency energy.

Referring to FIGURES 5 and 6, a portion of a magnetic head 60 is shown in cooperative relationship with a magnetic disc record in accordance with the invention. By way of example, the magnetic disc record shown in FIGURES 5 and 6 is the type shown in FIGURE 3. The dimensions of the magnetic head and of the disc record have been exaggerated in FIGURES 5 and 6 in order to clarify the illustration in the drawing. The magnetic head includes a core 62 of magnetic material (only the pole tip portions of which are shown) which is held in a non-magnetic support. The coils and other details of the head 60 may be of known form and are not shown. While only one core 62 is shown for the sake of simplicity, the head may have two or more cores in parallel, spaced relationship. The head 60 may be constructed in accordance with known magnetic head design techniques. The gap of the head is disposed substantially along a radius of the disc. The head may be supported with a tracking stylus on a common support member. The stylus tracks in the grooves formed in the hub 12 of the record. Accordingly, as the disc record rotates, the head 60 will track a longitudinal, spiral record track on the record surface of the magnetic tape annuluses, with which it is in contact.

As shown in FIGURES 5 and 6, the tape annulus 26 conforms the magnetic head 60 as the head travels along the record track. The confined volume 27 of air between the tape annulus 26 and the body of resilient material 22 is shown enlarged and exaggerated in FIGURES 5 and 6 for the sake of clarity. This confined volume of air acts like a large bubble which extends completely around the disc record. When the head 60 is disposed on the record, it exerts a downward force (e.g., 40 grams) on the recording surface of the magnetic tape annulus 26. Part of the force is due to loading by associated equipment. The air in the confined volume 27 therefore flows from the region immediately below the magnetic head 60. Since the air cannot escape from the space defined between the tape annulus 26 and the body 22 of resilient material, the bubble formed the tape 26 is depressed immediately under the head 60. The tape 26, therefore, conforms closely to the sides of the head 60, as shown in FIGURE 5.

As the record moves from left to right, as shown by the arrow A in FIGURE 6, a traveling wave 66 is formed immediately ahead of the head 60. This wave formation is due to the flow of air from the volume 64 which is established by the moving head 60. The wave shape is such that the tape 26 closely conforms to the head 60.

The body of resilient material 22 is slightly deformed under the force due to the weight of the head 60, the shape of deformation of the body 22 being such that the deformation will conform to the shape of the head. The tape 26 between the head 60 and the body 22 is conformed to the shape of the head due to the resilience of the confined volume of air 27 and the resilience of the body 22 of resilient material. The resilience of the confined volume 27 and the body 22 effectively removes any surface irregularity in the web 14 of the disc. Slight warping of the disc also does not adversely affect the head 60 to tape relationship. Strict tolerances are not required in the construction of the record, so that the record may be produced at low cost in large quantities. Each record will have substantially uniform recording properties since the resilience of the air volume 64 and the resilient bodies 22 and 24 compensate for most dimensional variations.

From the foregoing description, it will be apparent there have been provided improved information storage devices in the form of disc-type records or tablets. Although the invention has been described as embodied in a magnetic disc record, other record devices having different sizes and shapes may incorporate the features of the invention. Variations in the component parts of a record made in accordance with the invention will also be obvious to those skilled in the art. For example, the record may be constructed without a raised central hub and circular sheets may be used instead of tape annuluses. Moreover, other fluids may be used in the volume confined between the tape and the bodies of resilient material. The fluid media may be air, as described above in connection with the specific embodiments of the inventions disclosed herein, or some liquid may be inserted in the confined volume. A suitable liquid might be some light hydrocarbon or inorganic oil. Other changes within the spirit of the invention will, no doubt, also readily suggest themselves to those skilled in the art. Accordingly, the foregoing should be considered illustrative and not in any limiting sense.

What is claimed is:

1. An information storage device which comprises a relatively rigid member, a body of resilient material on the surface of said member, and a flexible member having an information storage surface secured to said member over said body and defining therewith an enclosed volume for containing a fluid between said body and said flexible member.

2. An information storage device which comprises a relatively rigid member having a planar surface, a flat cushion of resilient material on said surface, and a sheet of flexible material having an information storage surface, said sheet being disposed on said member surface, encompassing said cushion, and providing a confined film of air between said cushion and said sheet.

3. An information storage device which comprises a relatively rigid member having a flat, hard and smooth surface, a layer of resilient material on said surface, a sheet of flexible material having an information storage surface encompassing said layer and secured at the edges of said sheet to said member to confine a volume for containing a fluid between said layer and sheet, and a fluid-tight seal between the edges of said sheet and said member which secures said sheet to said member at said edges.

4. An information storage device comprising a relatively rigid member having a recess therein, a layer of resilient material in said recess, and a member of flexible material disposed over said layer and secured only at the edges thereof to said rigid member to confine a volume of air between said layer and said flexible material member, said flexible material member having a recording surface facing away from said rigid member.

5. A record device which comprises a tablet having a recess therein, a layer of resilient material in said recess, said layer being narrower than said recess and defining a groove around said layer in said recess, and a film having a recording surface disposed over said layer and secured in said groove only at the edges of said film to said tablet with said recording surface facing outwardly from said tablet.

6. A record device which comprises a relatively rigid member having a flat surface, said member having a recess in its flat surface, a layer of resilient cushioning material disposed in said recess, a layer of adhesive material disposed in said recess around the edges of said cushioning layer, and a sheet of flexible material having a recording surface disposed over said cushioning layer with said recording surface facing away from said rigid member, said sheet being secured at the edges thereof to said flat surface by said layer of adhesive material.

7. A record device which comprises a tablet having a recess therein, said tablet having a shoulder around the peripheral edge of said recess, a layer of resilient cushioning material disposed in said recess and extending approximately to said shoulder, a layer of adhesive material on said shoulder, and a sheet of flexible material having a recording surface disposed over said cushioning material and secured at the edges thereof to said adhesive layer on said shoulder to confine a volume of air between said cushioning layer and said sheet, said recording surface facing away from said tablet.

8. A magnetic disc record which comprises a circular tablet having a hub, a web and a rim, said web being thinner than said hub and said rim to define an annular channel in a surface of said tablet between said hub and said rim, a cushioning layer of fibrous flock material in said channel, said cushioning layer having a height less than the height of said channel and a width less than the width of said channel to define a pair of circumferential grooves in said channel each between a different edge of said cushioning layer and a different peripheral wall of said channel, an annulus of magnetic tape having peripheral inner and outer edges, the width of said tape annulus between said inner and outer edges being approximately equal to the width of said channel, and adhesive material in each of said grooves, said tape annulus being secured at its said inner and outer edges in said grooves by said adhesive material so as to trap a film of air thereunder between said tape annulus and said cushioning layer.

9. A magnetic disc record which comprises a circular tablet of nonmagnetic material having a hub, a web and a rim, said web being thinner than said hub and said rim to define a pair of annular channels in the opposed surfaces of said tablet, said hub having a pair of spiral tracking grooves each in a different end surface of said hub, said hub also having an axial hole for receiving a spindle, a pair of annular layers of cushioning material disposed separately in different ones of said channels, said cushioning layers having heights less than the heights of said channels and widths less than the widths of said channels to define pairs of circumferential grooves in said channels each between a different edge of said cushioning layers and a different peripheral wall of said channels, a pair of annuluses of magnetic tape having peripheral inner and outer edges, the width of each of said tape annuluses between their said inner and outer edges being approximately equal to the widths of said channels, and layers of adhesive material in each of said grooves, said tape annuluses each being disposed in a different one of said channels and being sealed at their said inner and outer edges to said tablet by said adhesive layers in said grooves.

References Cited by the Examiner

UNITED STATES PATENTS

| | | | |
|---|---|---|---|
| 1,425,979 | 8/22 | Kingsbury | 308—160 |
| 2,295,070 | 9/42 | Allen | 117—140 |
| 2,844,434 | 7/58 | Beard | 346—74 |
| 3,036,304 | 5/62 | Willard | 346—74 |

IRVING L. SRAGOW, *Primary Examiner.*